US 6,616,344 B1
United States Patent
Van Deventer

(10) Patent No.: US 6,616,344 B1
(45) Date of Patent: Sep. 9, 2003

(54) INTERCONNECTION SYSTEM FOR OPTICAL NETWORKS

(75) Inventor: Mattijs Oskar Van Deventer, Leidschendam (NL)

(73) Assignee: Koninklijke KPN N.V., The Hauge (NL)

(*) Notice: Subject to any disclaimer, the term of this patent is extended or adjusted under 35 U.S.C. 154(b) by 0 days.

(21) Appl. No.: 09/486,333

(22) PCT Filed: Sep. 4, 1998

(86) PCT No.: PCT/EP98/05723
§ 371 (c)(1),
(2), (4) Date: Feb. 24, 2000

(87) PCT Pub. No.: WO99/13656
PCT Pub. Date: Mar. 18, 1999

(30) Foreign Application Priority Data

Sep. 8, 1997 (NL) ............................................. 1006963

(51) Int. Cl.$^7$ ................................................. G02B 6/36
(52) U.S. Cl. ....................... 385/88; 385/89; 385/90; 385/135; 398/164
(58) Field of Search ...................... 359/163; 385/89–90, 385/135, 88

(56) References Cited

U.S. PATENT DOCUMENTS

| 4,870,637 A | * | 9/1989 | Follett et al. ............... 359/135 |
| 5,636,047 A | * | 6/1997 | Lagoutte et al. ............ 359/124 |

FOREIGN PATENT DOCUMENTS

| EP | 0 316 259 | 5/1989 |
| EP | 0 511 779 B1 | 11/1992 |
| NL | 1006963 | 6/1997 |
| WO | WO 95/20772 | 8/1995 |

OTHER PUBLICATIONS

Russell C. Stanley; "Fiber Optic Local–Area Networks"; pp. 390–398; Proceedings of the National Communications Forum; Sep. 30, 1988, No. 1.

Akira Himeno et al; "Experimental Optical Switching System Using Space–Division Matrix Switches Gated by Laser Diodes"; pp. 0928–0932; 1988 IEEE; Nov. 20, 1988.

M.J. Goodwin; "Optical Interconnect Technologies For High Performance Electronic Processor Systems"; 1993; pp. 85–90; GEC Journal of Research, vol. 10, No. 2.

I.M. Burnett et al; "Future Switching Requirements for Telecommunications Networks: Challenges for Photonics"; 1993; pp. 38–41; ECOC.

A. Herzberger et al; "Phase—A Comprehensive System For Synchronous Networks"; pp. 4–17; Philips Telecommunication Review; vol. 51, No. 2.

* cited by examiner

Primary Examiner—Kinfe-Michael Negash
(74) Attorney, Agent, or Firm—Frishauf, Holtz, Goodman & Chick, P.C.

(57) ABSTRACT

An optical interconnection system for the realization of network elements in optical networks comprises a set of functional optical circuit modules (15) and an interconnection panel (10). The panel is provided with a row of module positions (13.1, 13.2, 14.1, ..., 14.N) suitable for plugging in circuit modules (15), and with a pair of optical (1:N) splitters (16,17), each pair of corresponding ports of which (16A/17A, 16.1/17.1, ..., 16.N/17.N) are interconnectable to a pair of a number of pairs of connection ports (11, 12.1, ..., 12.N) through a module position and a circuit module plugged into that position. The set of circuit modules comprises circuit modules with functions for signal interconnection, for signal transport direction reversal, and for signal manipulation. A number of panels can be coupled together for purposes of, inter alia, expansion and/or protection.

21 Claims, 11 Drawing Sheets

INTERCONNECTION SYSTEM FOR OPTICAL NETWORKS

BACKGROUND OF THE INVENTION

Figure 1:
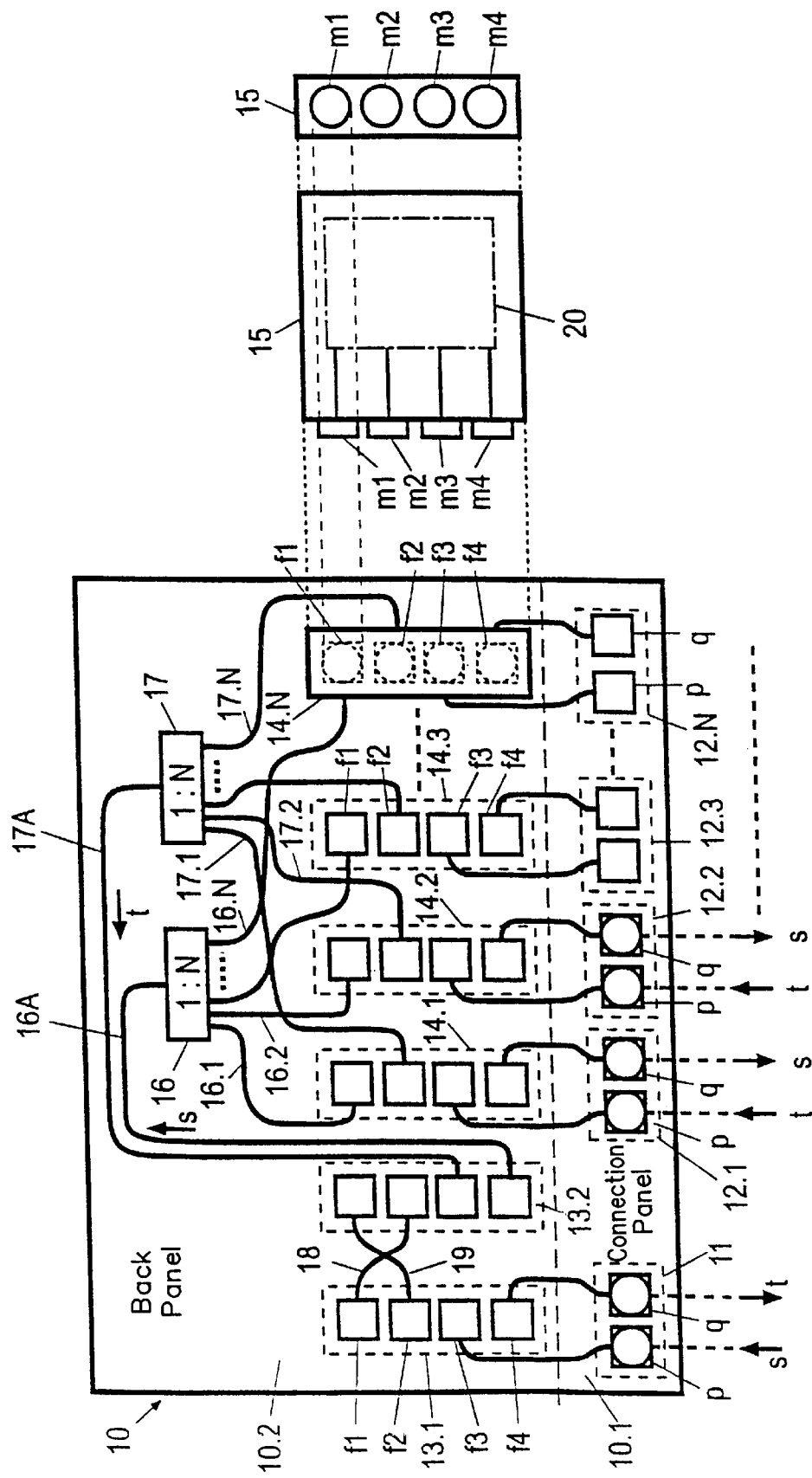

The invention is in the field of optical networks. More in particular, it concerns an optical interconnection system for the realization of network elements in such networks, provided with one or more identical interconnection members.

Telecommunication techniques increasingly use optical signal transmission through optical fibre links. Various types of optical networks, not only single point-to-point connections, bit also tree-shaped, star-shaped, or ring-shaped interconnect structures using passive and/or active network components, have already been developed for this purpose, or are under development. Furthermore, optical networks are increasingly being expanded with protection configurations. Such diversity in network structures requires a large variety of network elements. Such network elements can vary from such relatively simple elements as optical amplifiers, filters, and transponders, and passive optical splitters, in some cases combined with optical amplifiers, to more complex elements such as optical add/drop multiplexers (AODMs) and optical cross-connects (OXCs). For reasons of economy, both manufacturers/suppliers and network operators of optical networks find themselves facing the technical problem of realizing the largest possible variety of network elements using the smallest possible number of equipment components, with which in addition, a high degree of flexibility regarding adaptation according to function and capacity of the network elements is to be achieved. In reference [1], and more in particular in Section 4 of said reference, a problem of this type is analyzed for Synchronous Digital Hierarchy (SDH) networks. The conclusion of said analysis is that the number of types of installation racks for the various equipment components can be minimized only if a rack structure is used with a uniform back panel; and that a uniform back panel can be used thanks to the application of a signal bus into which, inter alia, so-call aggregate and tributary interfaces can be plugged to realize signal connections in the various transmit and receive directions of the network elements in question. A rack structure with a back panel provided with a signal bus of this type not only allows for flexible adaptation to meet the current need for capacity of a network element, it also enables flexible upgrading to take place to more complicated network elements, e.g. from an ADM (add/drop multiplexer) to an LXC (local cross-connect). In principle, a signal bus rack structure of this type can also be realized in the optical domain. Reference [2] for instance, describes a possible development path to a 'future node' based on an optical bus architecture, which may be ring-shaped. An optical bus of this type comprises a back panel with a number of parallel optical wave guides, on which, analogous to an electronic back panel, card-type modules fitted with optical circuits, hereinafter referred to as optical circuit modules, can be optically coupled. Typical problems that occur when optical power is drawn from optical conductors can be solved, e.g. by the application of optical fibre amplifiers in the back panel between the connection points. For the coupling of the optical circuit modules with each of the parallel wave guides in the Zoptical bus a technique is indicated which is known for example from reference [3]. In this reference, an optical bus is described consisting of a number of parallel optical fibres, D-shaped in section, in a back panel, to which card-type circuit modules are coupled with each of the optical fibres through specific connector blocks.

The application of a bus principle offers many advantages in the electrical domain. The application in the optical domain, however, is not as simple, since a signal bus is by principle a non-directional signal transport medium, whereas an optical wave guide, such as an optical fibre, is a directional signal transport medium. In addition, signal communication through a signal bus requires an additional bus protocol, calling for protocol conversions that can take place only in the electrical domain.

SUMMARY OF THE INVENTION

The purpose of the invention is to provide an optical interconnection system enabling a flexible realization of network elements. In doing so, it avoids the application of an optical signal bus, while still enabling a rack structure to be used with one or more identical interconnection members. It uses the insight that network elements in optical networks in most cases include a signal splitting function, and that a suitable manipulation of the optical signals is possible within the optical connections to and from the splitting means used, e.g. amplification, filtering, or regeneration.

An optical interconnection system for the realization of network elements in optical networks according to the introductory part of claim 1, and for the definition of which reference [3] has been used, according to the invention has the characteristic features according to claim 1.

Although in principle, optical fibre connections can be used bidirectionally, the risk of signal interference as a result of, inter alia, cross-talk will increase, and the bidirectional manipulation of optical signals is in most cases unfeasible, so signal traffic in either direction is preferably conducted through physically separate optical signal connections. In a preferred embodiment, the interconnection system according to the invention therefore has the characteristic features according to claim 2.

In order to offer an extra possibility for manipulation at the main ports of the optical signal splitters, a further preferred embodiment has the characteristic features according to claim 3.

The optical interconnection system according to the invention can also comprise more than one interconnection member. These members can be coupled together in various ways. According to a first variant of a coupling of this type, this can be implemented by connecting a pair of subsidiary ports of a member to the pair of main connection ports of a further member. For this purpose, a further preferred embodiment has the characteristic features according to claim 4. The coupling can also be effected by providing the member with a back panel onto which the row of module positions is fitted, in combination with a suitable positioning of the back panels of a number of interconnection members relative to each other in a rack or frame, and a design of the circuit modules that is adapted to this positioning. For this purpose, yet a further preferred embodiment has the characteristic features of claim 9.

Further preferred embodiments have been summarized in further subclaims.

Reference [4] discloses an optical interconnection apparatus for interconnecting via a back panel, using multiple fibre connectors, a number of printed circuit boards fitted with electrical wiring. These printed circuit boards are fitted with E/O and O/E converters that can be coupled to each other by means of multiple optical edge connectors connecting to optical fibre connectors located in grooves in the back panel, and also to external optical lines through separate optical connector points. However, there are no optical splitting devices in the back panel, and the purpose of the invention is not known from this.

Reference [5], which was not published in time, discloses an interconnection apparatus that provides optical and/or electrical signal interconnections of a number of input ports to a number of output ports through a segmentable signal bus. In this case an interconnection panel is used with a row of module positions for plugging in circuit modules, in combination with a set of circuit modules fitted with signal circuits with different bus functions. The signal bus can be composed of bus parts formed by permanent signal connections between subsequent modules and by the signal circuits of circuit modules plugged into the module positions.

The interconnection system according to the invention offers a relatively economical basic configuration for the implementation of a wide variety of network elements for various types of optical networks, which moreover can be expanded in a modular fashion without interruption of service, even to 100% of the optical fibre capacity of the connected optical fibre links.

References

[1] A. Herzberger et al., "PHASE—A comprehensive system for synchronous networks", Philips Telecommunication Review, Vol. 51, No. 2, pp. 4–17;
[2] I. M. Burnett and D. W. Smith, "Future switching requirements for telecommunication networks: Challenges for photonics", ECOC '93(?), TuP3.1, pp. 38–44;
[3] WO 95/20772;
[4] EP-A-0511779;
[5] Dutch patent application by applicant: application no. 1006239, application date Jun. 5, 1997.

All references are deemed to be incorporated in the present application.

SHORT DESCRIPTION OF THE DRAWING

Figure 2:
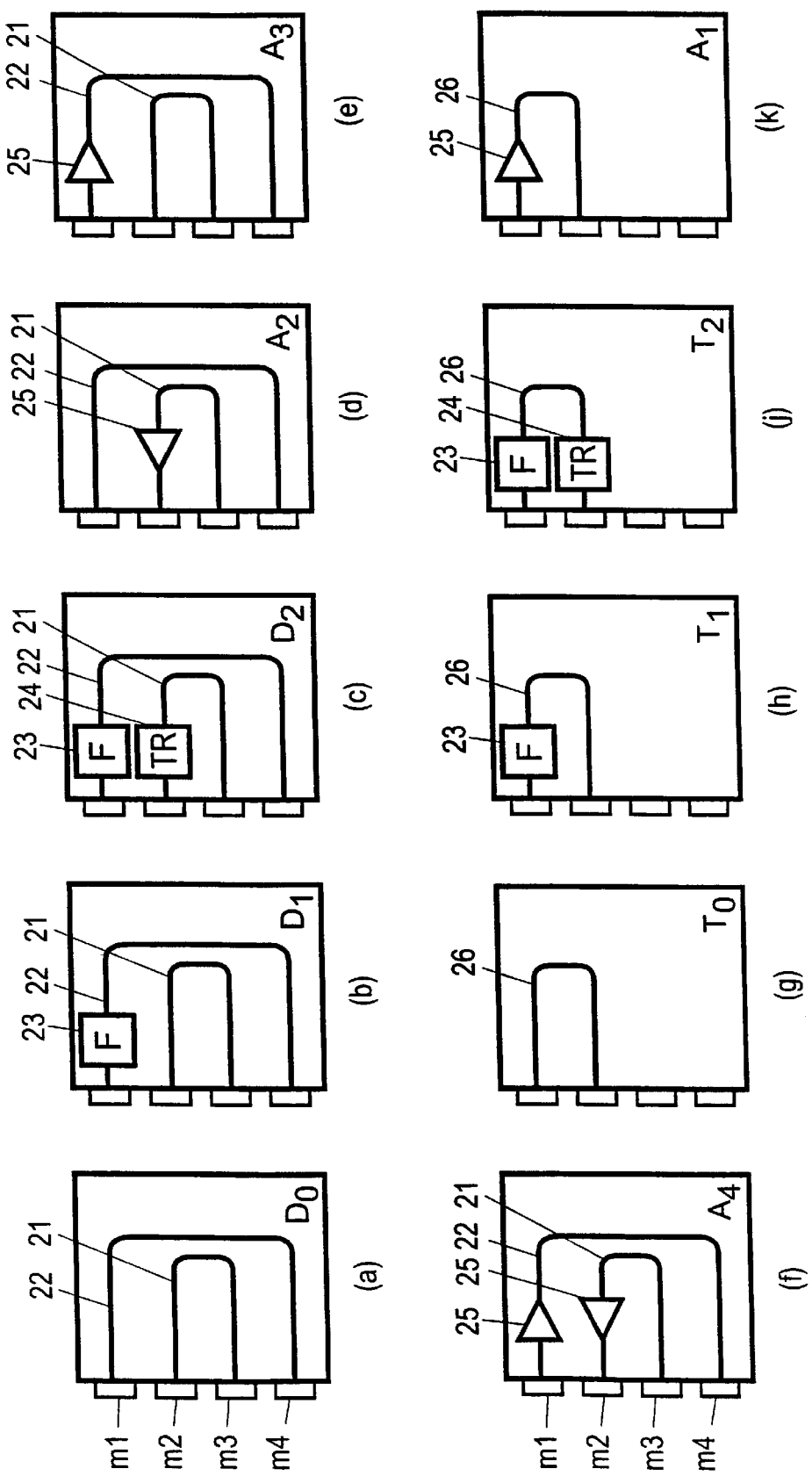
Figure 3A:
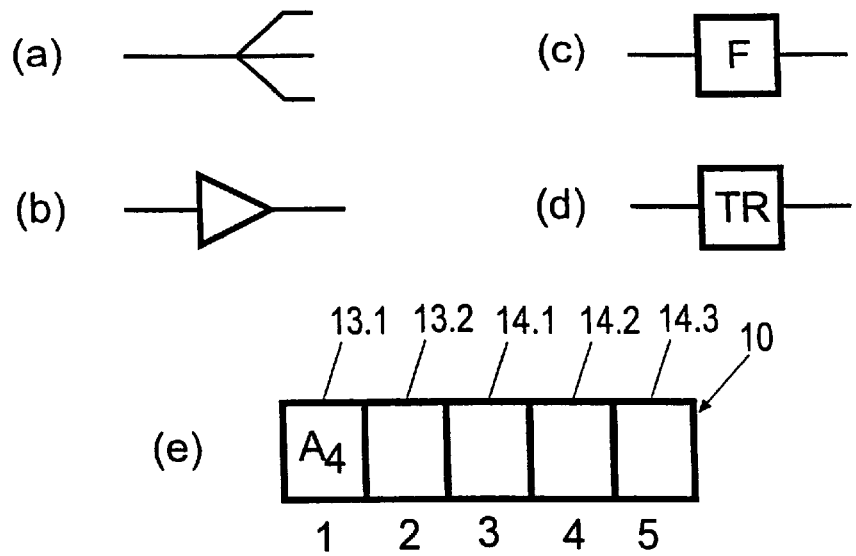
Figure 4:
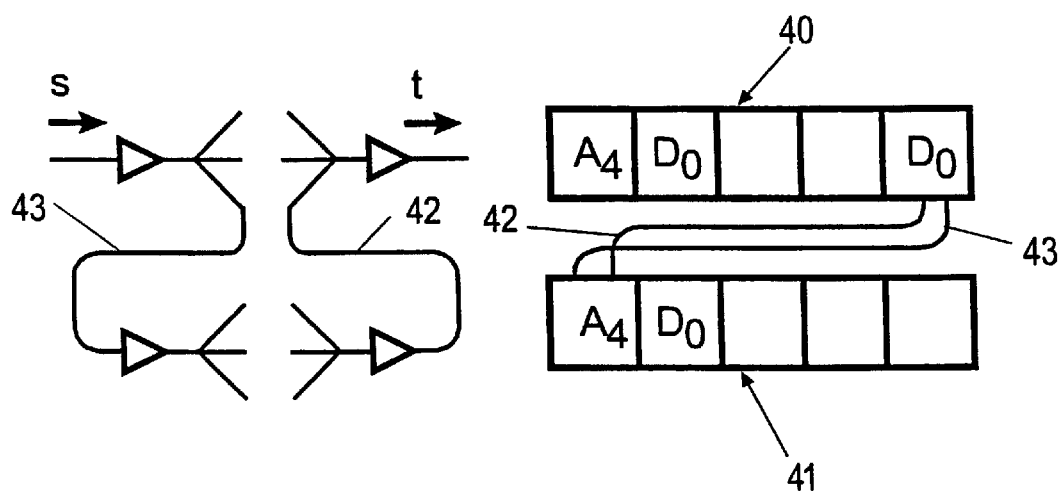
Figure 3B:
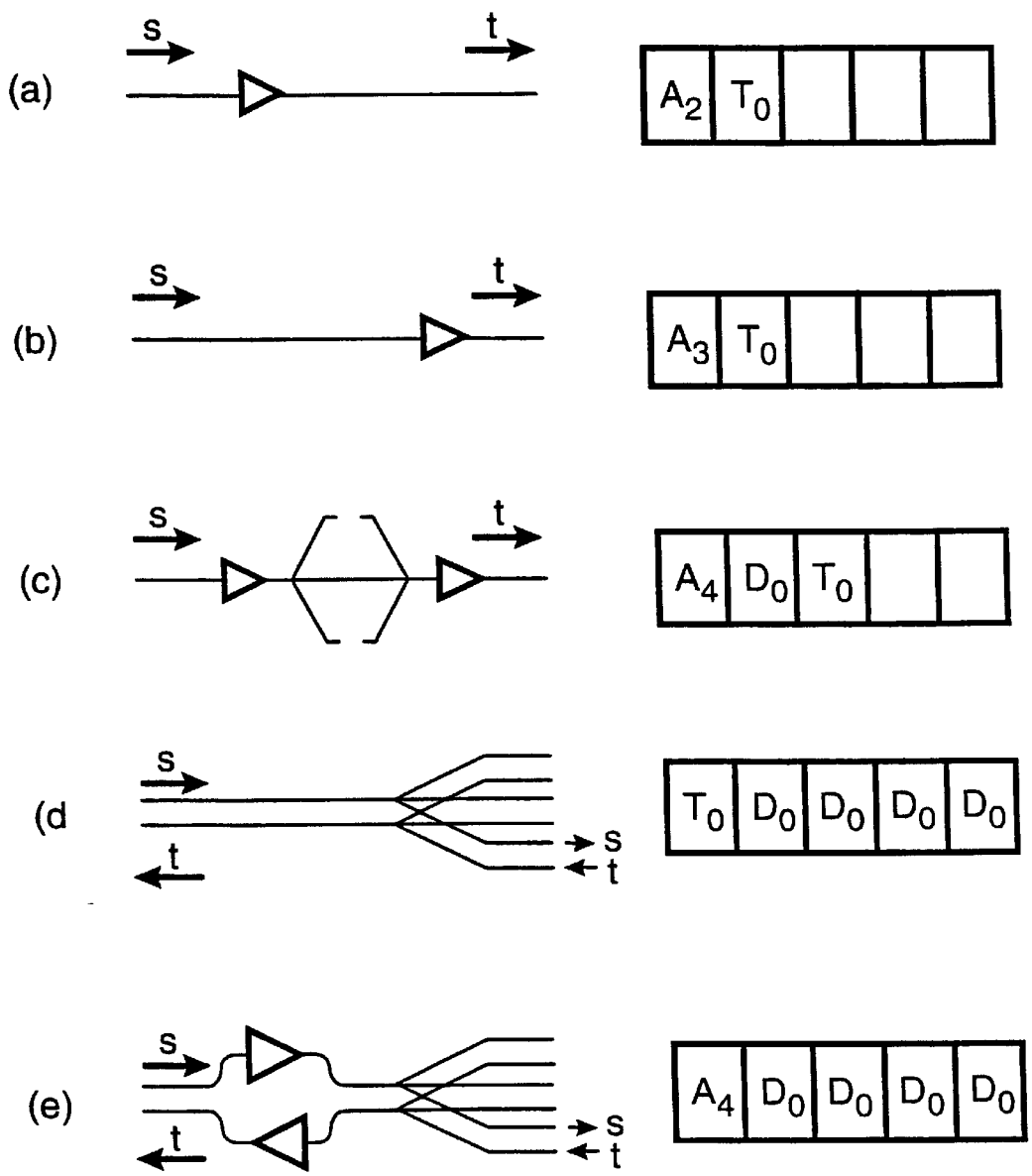
Figure 3B:
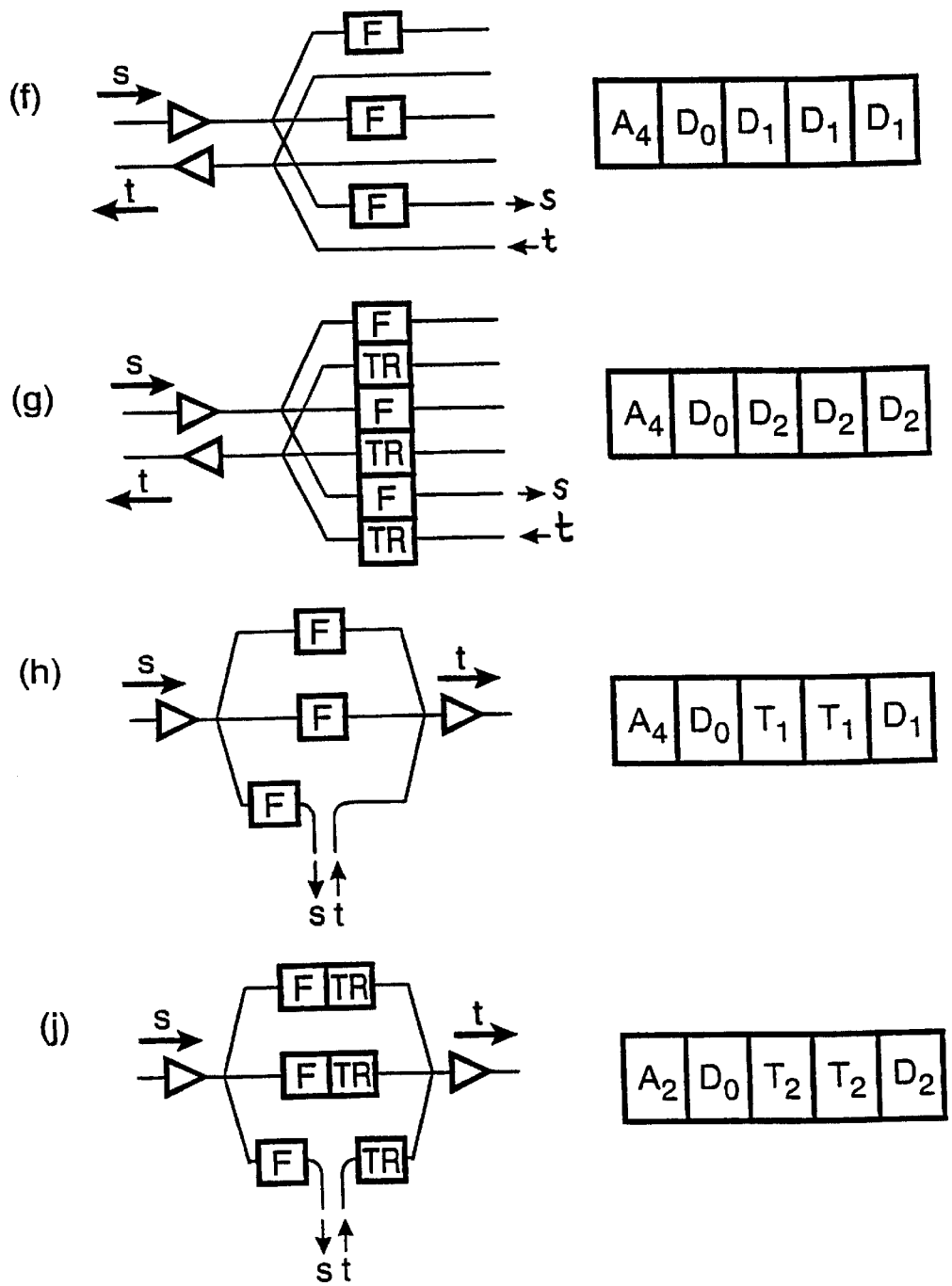
Figure 5:
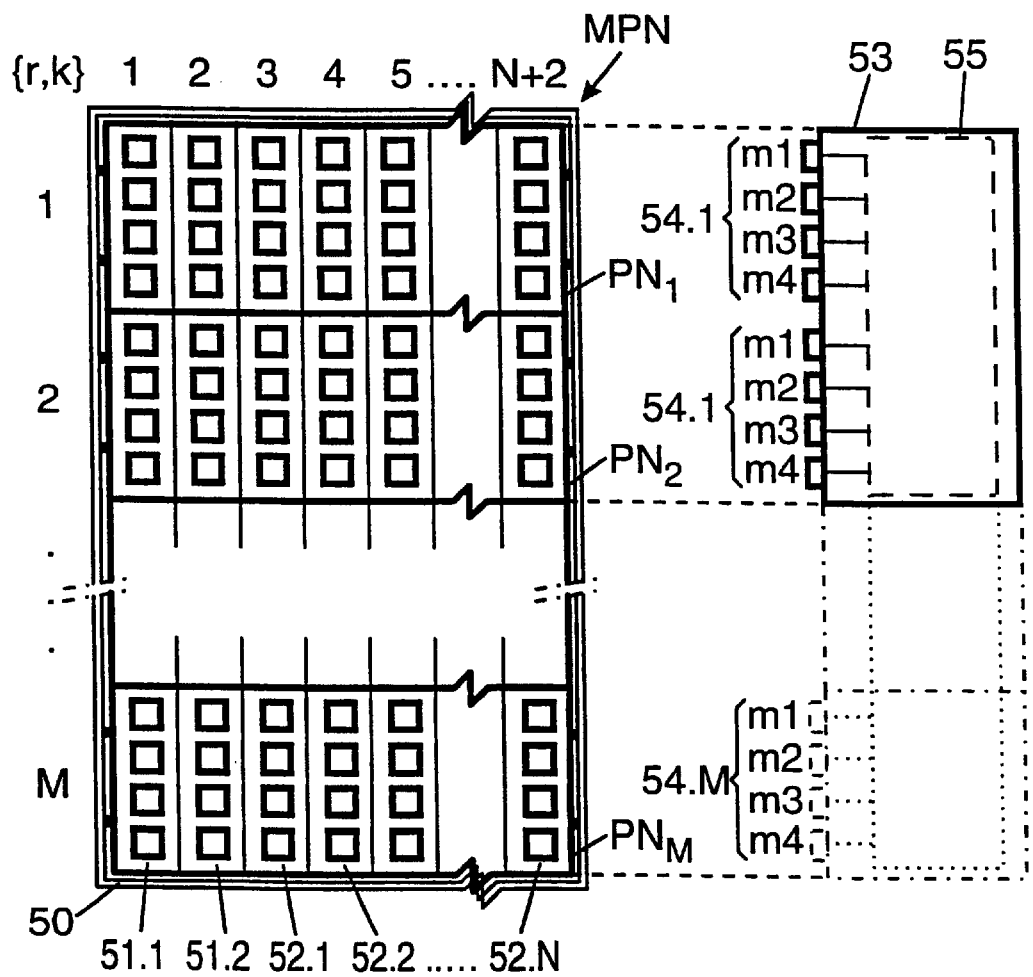
Figure 7:
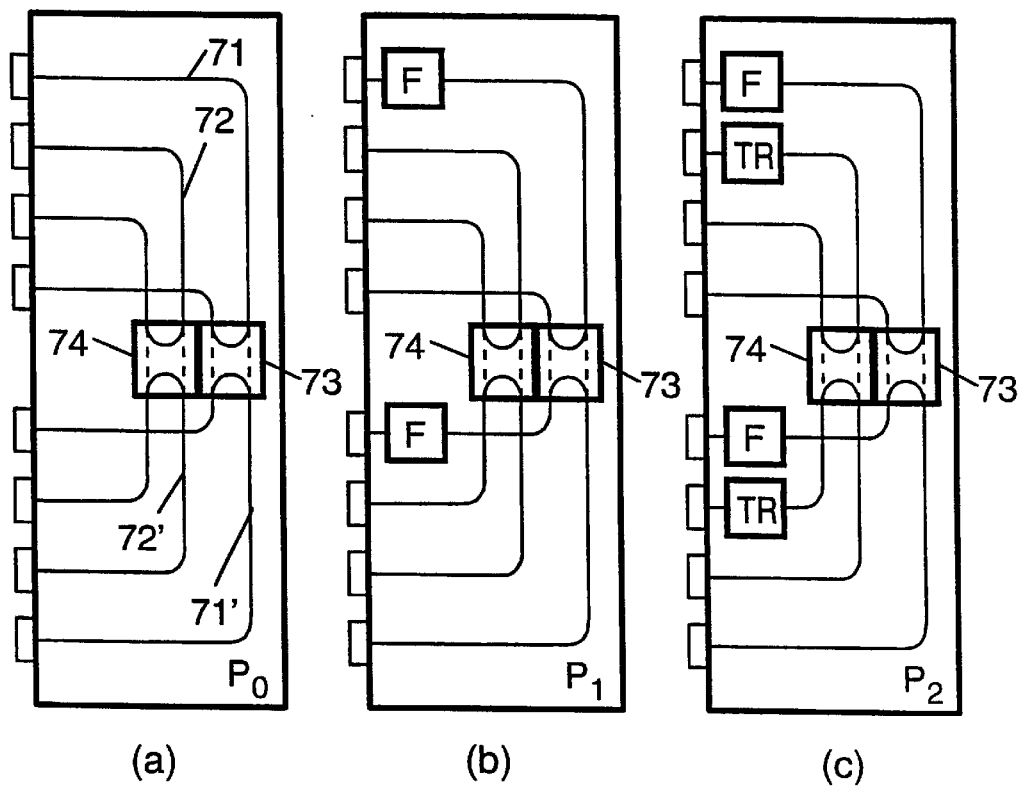
Figure 6:
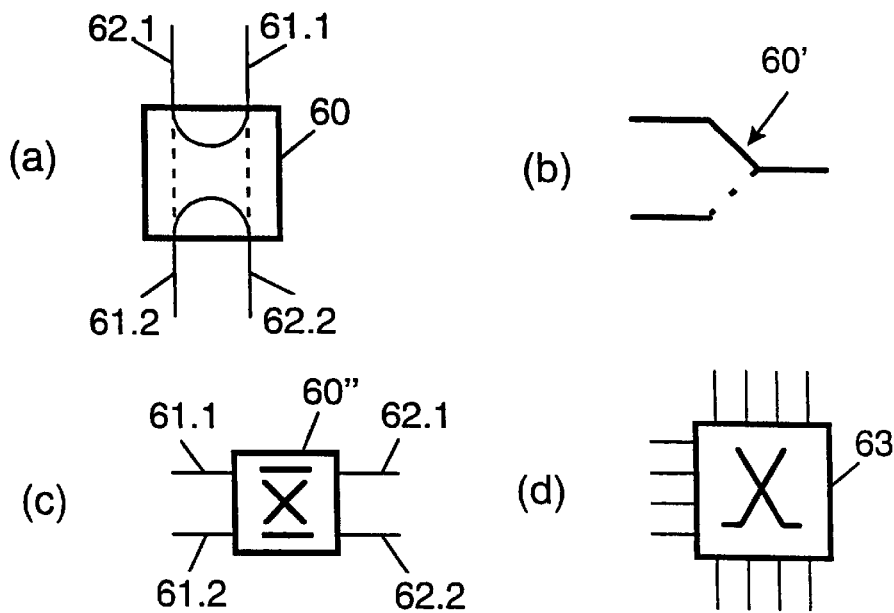
Figure 7:
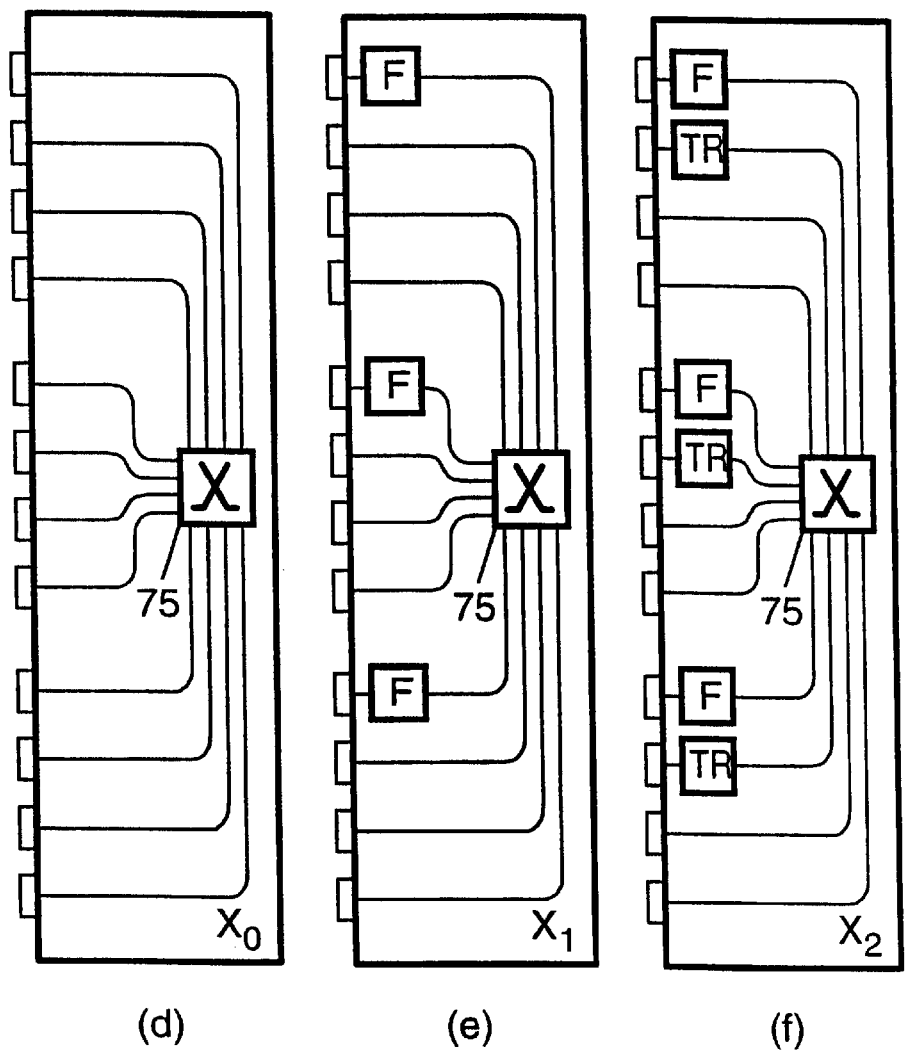
Figure 8:
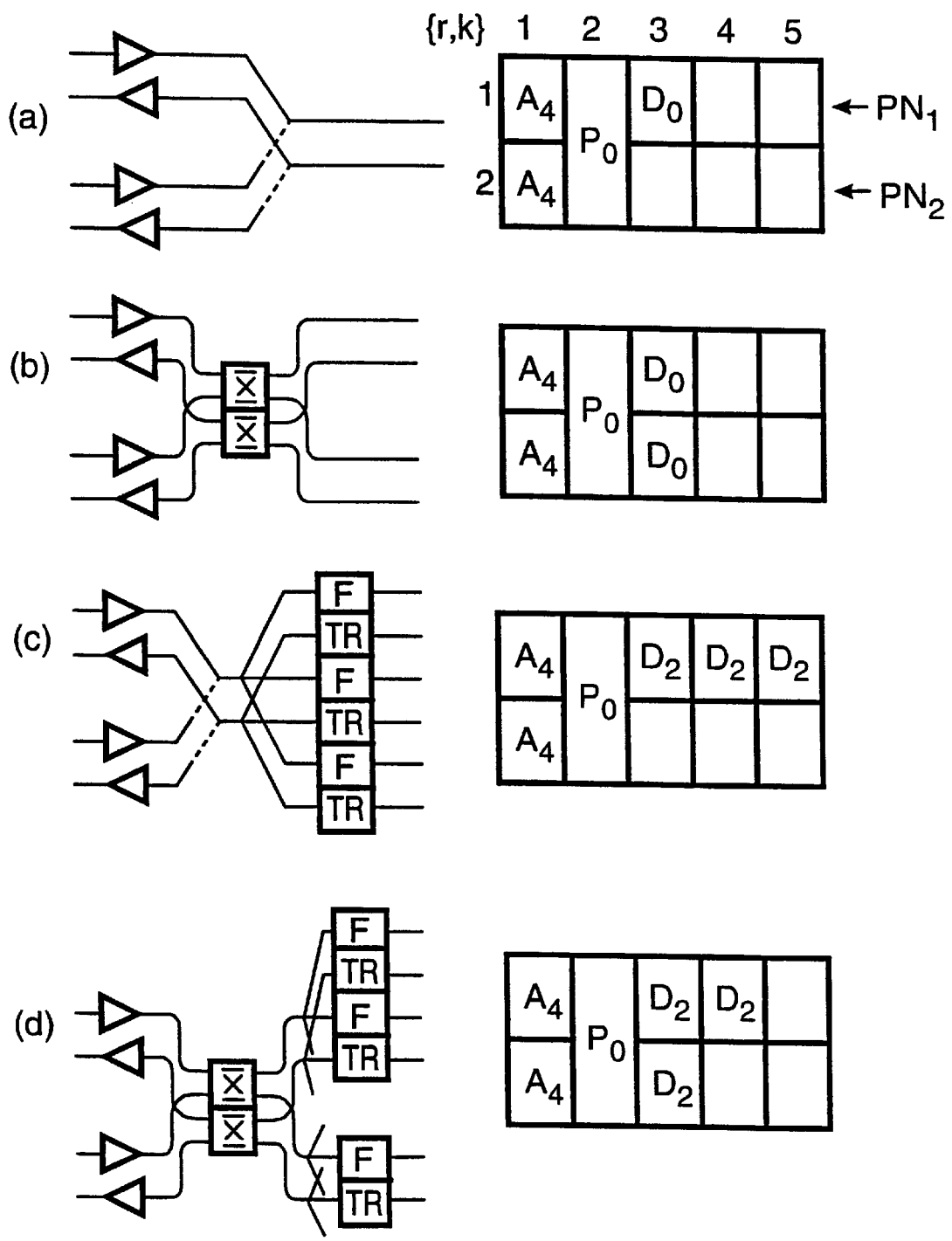
Figure 8:
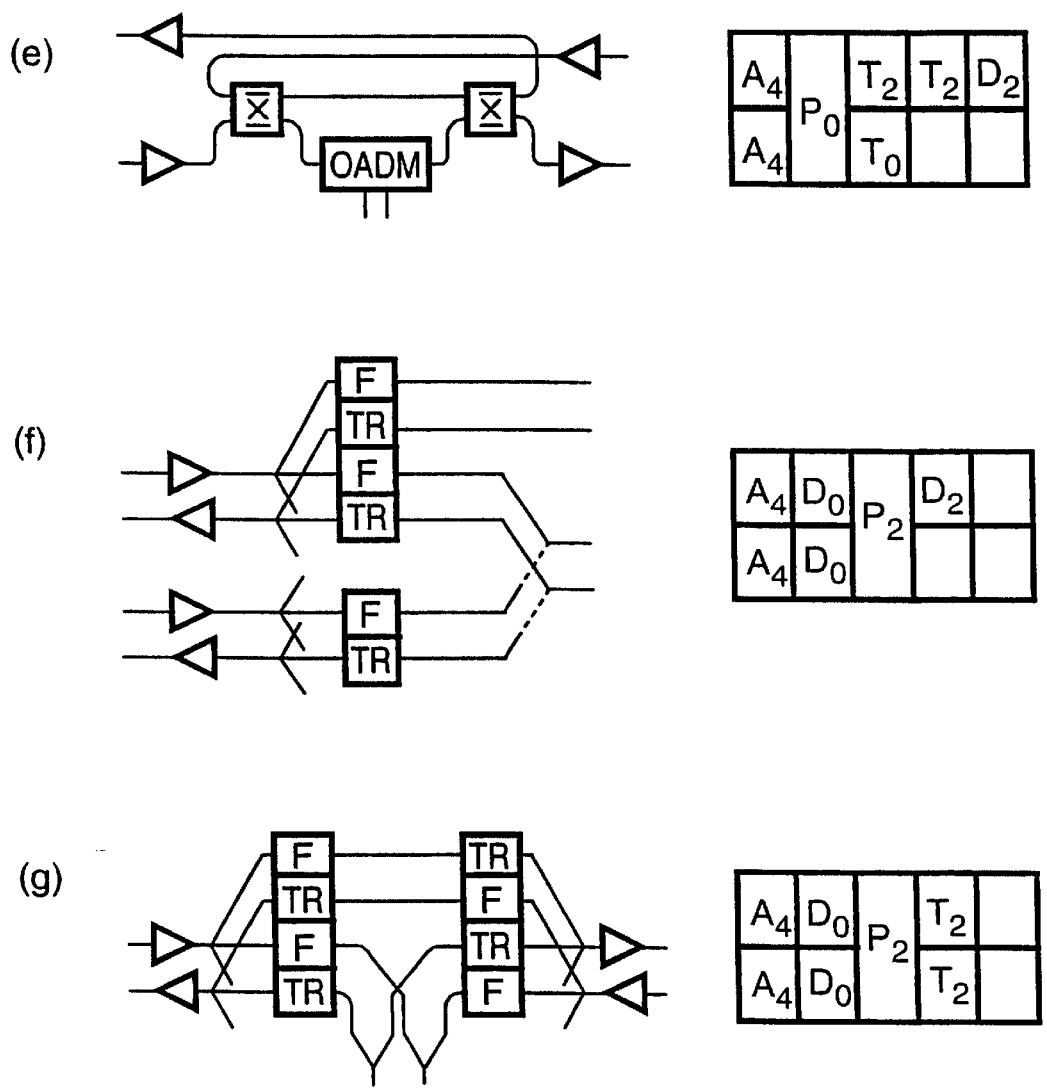
Figure 9:
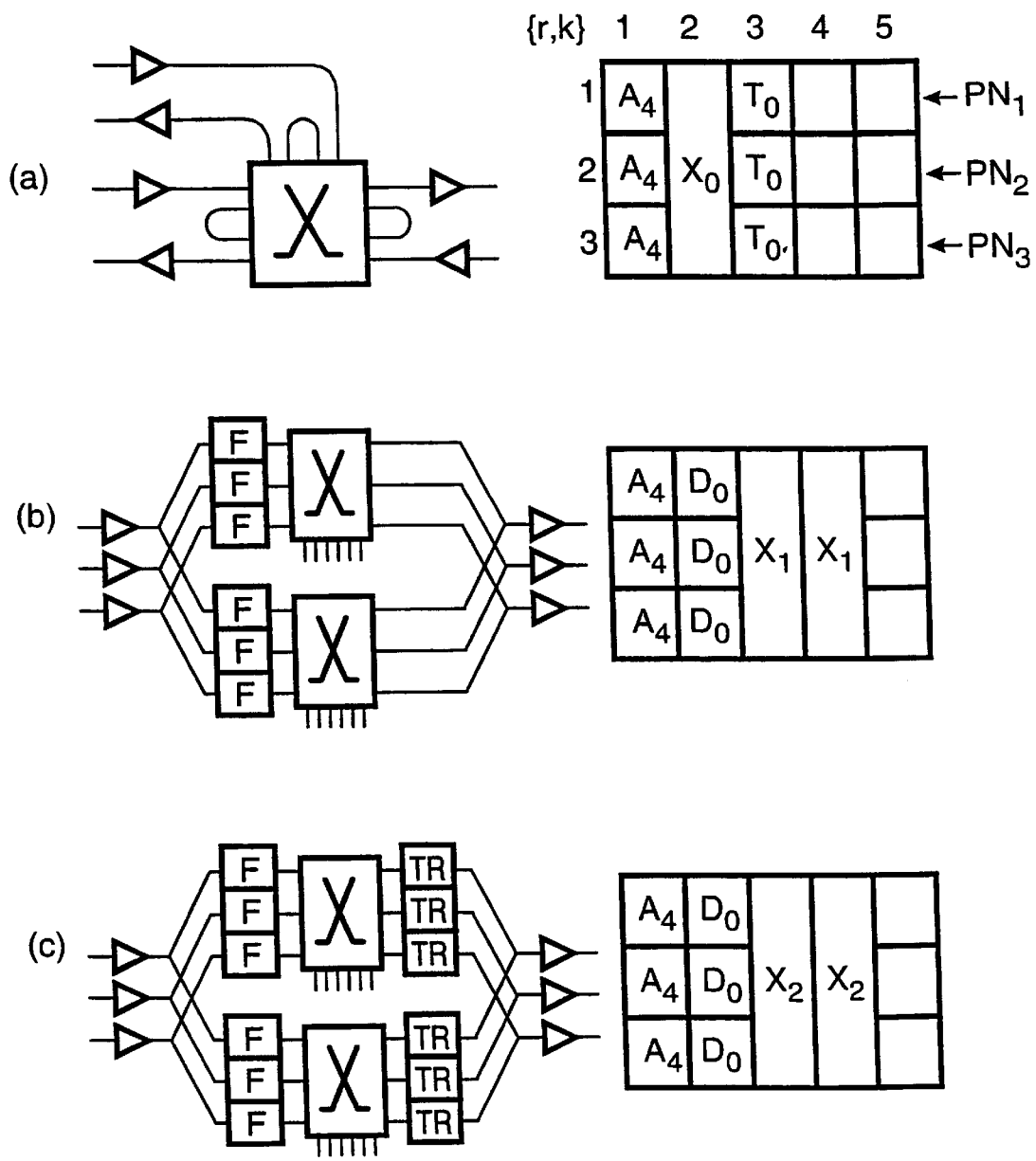

The invention will be explained in greater detail by means of a description of an exemplary embodiment, with reference to a drawing containing the following figures:

FIG. 1 showing a schematic diagram of an optical interconnection system according to the invention;

FIG. 2 showing in parts (a)–(k) schematic diagrams of ten types of circuit modules for an interconnection system according to FIG. 1;

FIG. 3A showing in parts (a)–(e) five symbols for use in FIG. 3B, and in figures FIGS. 7–9;

FIG. 3B showing in parts (a)–(j) schematic diagrams of nine applications of the interconnection system according to FIG. 1 using the circuit modules shown in FIG. 2;

FIG. 4 showing a first embodiment of a coupling between interconnection panels;

FIG. 5 showing a schematic diagram of a frame with interconnection panels which can be coupled by means of multiple circuit modules;

FIG. 6 showing in parts (a) and (b) two further symbols for use in figures FIGS. 7, 8, and 9;

FIG. 7 showing schematic diagrams in parts (a)–(c) of a first group and in parts (d)–(f) of a second group of multiple circuit modules;

FIG. 8 showing in parts (a)–(g) schematic diagrams of seven applications of an interconnection system provided with a frame according to FIG. 5;

FIG. 9 showing in parts (a)–(c) schematic diagrams of three applications of an interconnection system provided with a frame according to FIG. 5.

DESCRIPTION OF AN EXEMPLARY EMBODIMENT

FIG. 1 shows a schematic diagram of a first embodiment of an interconnection system according to the invention. It comprises an interconnection member 10, which may be in the form of a panel, hereinafter referred to as interconnection panel. Interconnection panel 10 is subdivided into a connection panel 10.1 and a back panel 10.2. The connection panel is provided with a pair of main connection ports 11 and N pairs (N=1, 2, . . . ) of subsidiary ports 12.1–12.N. Each pair of subsidiary ports has an input port p and an output port q, which have been configured for the connection of incoming and outgoing optical signal transport lines. The back panel 10.2 is provided with N+2 module positions, i.e. two main module positions 13.1 and 13.2, and N subsidiary module positions 14.1–14.N. Each of the N+2 module positions is configured for accepting plug-in optical circuit modules 15. For this purpose, a circuit module 15 is provided with four optical connectors m1–m4, and each module position is provided with four optical receptacles f1–f4. In addition, the back panel 10.2 is provided with optical beam splitter provisions, in this case two optical signal splitters 16 and 17. Each of the two signal splitters has a main port, 16A and 17A, and N subsidiary ports, 16.1–16.N and 17.1–17.N, respectively. The ports of the optical signal splitters have permanent optical signal connections to the module positions, as follows. The main ports 16A and 17A are connected to the receptacles f4 and f3 of the main module position 13.2, respectively; the first subsidiary ports 16.1 and 17.1 are connected to the receptacles f1 and f2 of the first subsidiary module position 14.1, respectively; the second subsidiary ports 16.2 and 17.2 are connected to the receptacles f1 and f2 of the second subsidiary module position 14.2, respectively; etc.; and finally, the Nth subsidiary ports 16.N and 17.N are connected to the receptacles f1 and f2 of the Nth subsidiary module position 14.N, respectively. The pairs of connection ports on the connection panel also have permanent optical signal connections to the module positions, as follows. The connection ports p and q of the pairs of main and subsidiary connection ports 11 and 12.1–12.N are connected to the receptacles f3 and f4 of the main and subsidiary module positions 13.1 and 14.1–14.N, respectively. Of the module positions, only the two main module positions 13.1 and 13.2 are interconnected, as follows. The receptacles f1 and f2 of the first main module position 13.1 have permanent optical signal connections 18 and 19 with the receptacles f2 and f1 of the second main module position 13.2, respectively.

The signal splitters 16 and 17 preferably are optical (1:N) power splitters, but can also be of another type, e.g. WDM (de)multiplexers or WDM routers. The optical power splitters preferably are selected symmetrically, the optical power in the splitting direction being evenly distributed among the ports. However, in principle they can also be asymmetrical, consisting of e.g. N power splitters switched in series, in which any lack of optical power symmetry can be compensated by means of optical amplification at suitably selected module positions.

The interconnection system can be used to implement semi-permanent optical signal interconnections between the pair of main connection ports 11 and the pairs of subsidiary connection ports 12.1–12.N, but also between the pairs of main connection ports, depending on the circuit modules plugged into the module positions. A first signal transport direction from a main connection port via the signal splitter 16 in the direction of one or more of the subsidiary connection ports has been indicated with arrows s. A second signal transport direction from one or more subsidiary connection ports via the signal splitter 17 in the direction of a main connection port, i.e. in the opposite direction, has been indicated by arrows t. For the purpose of implementing the semi-permanent signal interconnections, the interconnection system comprises a set of circuit modules. This set is subdivided into two subsets, one subset of single circuit modules, and one subset of multiple circuit modules. The subset of multiple circuit modules will be discussed further on. The circuit module 15 shown in FIG. 1 is a single circuit module, provided with an optical circuit 20, which in addition to a signal-conducting function, can also have a signal-manipulating function (see below). The subset of single circuit modules in turn is subdivided into two groups. The circuit modules of the first group are such that the optical circuit 20 provides optical interconnections between the connectors m3 and m2 in the first signal transport direction (arrows s), and between the connectors m1 and m4 in the second signal transport direction (arrows t). Of the circuit modules of the second group, the optical circuit 20 provides an optical interconnection between the connectors m1 and m2, as a result of which the signal transport direction is in fact reversed from the first into the second, or from the second into the first signal transport direction. FIG. 2 shows in parts (a)–(f) six different types of circuit modules of the first group, and in parts (g)–(k) four different types of the second group. Part (a) shows a circuit module with interconnections 21 and 22 in both signal transport directions: type designation $D_0$; part (b) also shows a circuit module with an interconnect function in both directions, in which interconnection 22 incorporates an optical wavelength filter 23: type designation $D_1$; the circuit module of part (c) is identical to that of part (b), in which in addition a transponder 24 has been incorporated in the interconnection 21: type designation $D_2$. Parts (d), (e), and (f) also show circuit modules with an interconnect function in both directions, in which an optical amplifier 25 has been incorporated in the interconnection 21, or in the interconnection 22, or in both interconnections: type designations $A_2$, $A_3$, and $A_4$, respectively. Part (g) shows a circuit module with an interconnection 26 which reverses the signal transport direction: type designation $T_0$; the parts (h), (j), and (k) also show circuit modules with a similar interconnection 26, in which however, either an optical filter 23, or a combination of an optical filter 23 and a transponder 24 in series, or an optical amplifier 25 has been incorporated: type designations $T_1$, $T_2$, and $A_1$, respectively.

Of course, the connection ports for the incoming and outgoing signal transport lines can also be implemented on two different connection panels. In principle, the module positions can also be duplicated, i.e. N+2 for each signal transport direction, and implemented using only two receptacles and associated circuit modules instead of four. However, an interconnection panel of this type is less compact, and a relatively simple reversal of the signal transport direction as by means of the single circuit modules of the second group is impossible. In addition, the connection panel need not form a whole with, or be located in the same plane as, the back panel. Also, the module positions can be located along an edge on one side of a back panel, which can be rectangular in shape, in a manner similar to that described in reference [4], with the connection points being located as optical connector points along an edge of an opposite side of the rectangle, and the optical signal splitters and their associated optical connections with the module positions and the connection points being located on or in the back panel. In this context, the signal splitters and the associated optical connections can be discrete components, but they can also be entirely or partly implemented in integrated form. The circuit modules, for example, have been implemented as a card or printed circuit board provided with edge connectors for optical signal connections according to a technique known per se, as described for example in the reference [4] mentioned above.

Hereinafter a number of network elements will be described schematically for N=3, which network elements can be implemented using an interconnection system comprising an interconnection panel 10 according to FIG. 1 and a set of circuit modules as shown in FIG. 2. In this context, reference is made to FIG. 3A and FIG. 3B. FIG. 3A shows in parts (a)–(e) five drawing symbols which have been used in FIG. 3B to indicate equipment components. Part (a) shows the symbol for an optical (1:3) splitter, which is used in FIG. 3B to indicate the signal splitters 16 and 17 of FIG. 1 for N=3. Parts (b), (c), and (d) in turn show the symbols of an optical amplifier, an optical filter, and a transponder, which are used in FIG. 3B to indicate the optical amplifiers 25, the optical filters 23, and the transponders 24 on the circuit modules shown in FIG. 2. Part (e) shows a symbolical representation of interconnection panel 10 of FIG. 1, reduced to a matrix of one row with five positions represented by boxes 1–5, which indicate the module positions for N=3, i.e. the main module positions 13.1 and 13.2, and the subsidiary module positions 14.1, 14.2, and 14.3. Placing one of the type designations of the circuit modules of FIG. 2 in one of the boxes indicates that the circuit module in question has been plugged into the module position corresponding with the box. For example, the designation $A_4$ in the first box means that a circuit module as shown in part (f) of FIG. 2 has been plugged into the first main module position 13.1. Using the symbols of FIG. 3A, the parts (a)–(j) of FIG. 3B show nine examples of network elements (NE), each part showing on the left a schematic diagram of the optical circuit of an NE, and on the right, the matrix representation of an implementation using the interconnection system described. In addition, signal transport directions have been indicated in the optical circuits on the left (arrows s and t). Parts (a) and (b) show network elements that consist of a preamplifier and a booster amplifier, respectively. In these cases, only the two main module positions of the connection panel are used. Part (c) shows as network element an in-line amplifier. Parts (d) and (e) show as network element a node with a splitter function, without amplification for a passive optical network (PON), and with amplification for a Super PON, respectively. Parts (f) and (g) show as network element an optical terminal multiplexer (OTM), without and with transponders, respectively. Parts (h) and (j) show as network element an optical add-drop multiplexer (OADM), without and with transponders, respectively.

Two or more interconnection panels can be coupled in different ways. A first embodiment of this, called 'frame extension', is shown schematically in FIG. 4 in a manner similar to that of FIG. 3B. Said coupling is effected between two interconnection panels 40 and 41 (of a same type as interconnection panel 10) by means of optical interconnections 42 and 43 between a pair of subsidiary connection ports (such as the pair 14.3 in FIG. 1) of the connection panel 40 and the pair of main connection ports (such as 13.1 in FIG. 1) of the interconnection panel 41. The use of such a 'frame extension' enables, for example for a Super PON, a network element with a combined ($1:N^2$) amplifier/splitter function to be created with only N+1 interconnection panels.

A second embodiment for a coupling of two or more interconnection panels is possible by providing the circuit modules with a shape and signal circuit such that they can form optical interconnections between module positions of the various interconnection panels. FIG. 5 shows a schematic diagram of an exemplary embodiment of this. For this purpose, the interconnection apparatus comprises a frame 50 into which M (M=2, 3, . . . ) interconnection panels $PN_1$–$PN_M$ (of a same type as interconnection panel 10) have been fitted. The M interconnection panels $PN_1$–$PN_M$ in the frame form a multiple interconnection panel MPN. In the figure, the frame 50 has been indicated, by way of example and for the sake of simplicity, as a line frame. Each interconnection panel has a row of N+2 module positions (with N≧2), i.e. two main module positions 51.1 and 51.2, and N subsidiary module positions 52.1–52.N. The M interconnection panels have been incorporated into the frame in positions that are fixed relative to each other, in which the module positions of the M interconnection panels form a, preferably rectangular, matrix (r,k) with M rows (r=1, . . . , M) and N+2 columns (k=1, . . . , N+2). The figure shows each panel $PN_1$–$PN_M$ in a form reduced to the row of module positions, in a manner similar to that of part (e) of FIG. 3A for M=1. At each separate module position (r,k) of the matrix, a circuit module of the subset of single circuit modules, such as of the types shown in FIG. 2, can be plugged in, as described above. A single circuit module has only a single foursome of optical connectors, m1–m4. A multiple circuit module 53 is provided with more than one foursome of such optical connectors. A double circuit module is provided with two foursomes 54.1 and 54.2, a triple module has three of such foursomes, etc.; and an M-fold module has M foursomes 54.1–54.M. A multiple circuit module 53 is provided with an optical control circuit 55 which, in addition to signal-conducting and signal-manipulating functions, can have a switching function. A multiple circuit module 53 can be plugged in at two or more circuit positions simultaneously within one column of the matrix. With reference to the figures FIGS. 7, 8, and 9, examples of this will be described for M=2 and M=3. In addition to FIG. 3A, FIG. 6 shows four further symbols which are used in this context to indicate a number of other equipment components. Part (a) concerns an optical cross-bar switch 60 with two switch positions: a first switch position S1 (continuous lines), in which a first and a second input port 61.1 and 61.2 are connected to a first and a second output port 62.1 and 62.2, respectively; and a second switch position S2 (broken lines), in which the first and the second input port 61.1 and 61.2 are connected to the second and the first output port 62.2 and 62.1, respectively. Part (b) shows the symbol for a (1:2) switch 60', which corresponds with the cross-bar switch 60 of part (a), but the output port 62.2 of which is not used (and therefore has been omitted from the figure). Part (c) shows a symbol of a cross-bar switch 60", which corresponds with the switch 60 of part (a), of which the input and output ports 61.1/61.2 and 62.1/62.2 have been arranged differently. Part (d) concerns an optical matrix switch 63, in this case a 6×6 optical space switch with six input ports and six output ports. (Note: In the symbol for the optical matrix switch, the input and output ports are shown as twelve ports, grouped in three groups of four; another group layout of three, six, and three is also used, as in parts (b) and (c) of FIG. 9.) FIG. 7 shows in parts (a), (b), and (c) three double, and in parts (d), (e), and (f) three triple circuit modules. The double circuit module of part (a) with type designation $P_0$ is in fact a composite of two single circuit modules of type $D_0$ (see part (a) of FIG. 2), the interconnections 71 and 72, and 71' and 72' of which have been coupled by means of two cross-bar switches, 73 and 74 respectively (both indicated by the symbol as shown in part (a) of FIG. 6). The coupling is such that, if both switches 73 and 74 are set to switch position S1, the circuit module of type $P_0$ will act as two separate single circuit modules of type $D_0$; whereas with both switches set to the second switch position S2, the interconnections 71 and 72 are connected to the interconnections 71' and 72', respectively. Parts (b) and (c) show double circuit modules with the type designations $P_1$, and $P_2$, respectively, which are, in a manner identical to that of the double circuit module of type $P_0$, a composite of two single circuit modules, of types $D_1$ and $D_2$, respectively (see parts (b) and (c) of FIG. 2). Part (d) shows a triple circuit module with type designation $X_0$, which is in fact a composite of three single circuit modules of type $D_0$, the interconnections of which are coupled via a 6×6 matrix switch 75 with six input ports and six output ports. The parts (e) and (f) show triple circuit modules with type designations $X_1$ and $X_2$, respectively, which are, in a manner identical to that of the double circuit module of type $X_0$, a composite of three single circuit modules, of types $D_1$ and $D_2$, respectively (see parts (b) and (c) of FIG. 2).

The types of double circuit modules shown are eminently suitable for use in protection configurations. Seven examples of this are shown in parts (a)–(g) of FIG. 8. In a similar manner as in FIG. 3B, each part shows, on the left, a schematic diagram of the optical circuit of an NE, and to the right, the matrix representation of a realization using a multiple interconnection panel MPN for M=2 and M=3. The multiple interconnection panel MPN is represented symbolically by a matrix of (2×5) boxes which represent the module positions of the two interconnection panels PN1 and PN2 in the multiple interconnection panel MPN. The parts (a)–(e) show protection configurations in which a double circuit module of type $P_0$ is used in the second column of the matrix, i.e. at the second module position (13.2 in FIG. 1) of both panels, PN1 and PN2. Part (a) shows an NE with a protection configuration, in this case a (1+1) type protection, for a pair of bidirectional optical connections. Part (b) shows an NE with a protection configuration, in this case a (1:1) type protection, for two pairs of bidirectional optical connections. By plugging in further circuit modules of type $D_0$ at the unoccupied module positions, protection configurations are obtained for the NE shown in part (e) of FIG. 3B. In a similar manner, part (c) and part (d) show an NE with protection configuration, in this case a (1+1) type protection and a (1:1) type protection, respectively, for an optical multiplexing section (OMS) like the OTM shown in part (g) of FIG. 3B. Part (e) shows an NE with a protection configuration for the OADM shown in part (j) of FIG. 3B. For protection purposes, instead of the pair of main module positions in the second column of the matrix, two subsidiary module positions in the same column of the matrix can also be used, enabling forms of so-called optical channel protection (OCH protection) to be realized. Part (f) shows an NE with OCH protection for an OTM (see part (g) of FIG. 3B), and part (g) shows an NE with OCH protection for an OADM (see part (j) of FIG. 3B).

The triple circuit module types are suitable for realizing NEs with an optical cross-connect (OXC) function. Three examples of this are shown in parts (a)–(c) of FIG. 9. Each part shows, on the left, a schematic diagram of the optical circuit of an NE with such a function, while to the right, the matrix representation of a realization using the multiple interconnection panel MPN for M=3 and N=3 is shown. Part (a) shows an NE with an optical fibre router function with amplification, in fact the simplest form of an OXC (three pairs of input and output ports of the 6×6 matrix switch have been interconnected). For this purpose, the triple circuit module of type $X_0$ has been placed in the second column of the matrix, in combination with three single circuit modules of type $T_0$ in the third column, and circuit modules of type $A_4$ in the first column. Parts (b) and (c) show an NE for an OXC, without and with transponders (TR), respectively. For this purpose, a triple circuit module has been placed in both the third and the fourth column of the matrix, of type $X_1$ in part (b), and of type $X_2$ in part (c), while in both configurations, the first column has been filled with circuit modules of type $A_4$, and the second column with circuit modules of type $D_0$.

In the above, only optical signal connections and interconnection possibilities of the interconnection system have been shown in the descriptions of the exemplary embodiments. Any necessary electrical wiring for power supply purposes, e.g. to amplifiers and transponders, and for control purposes, e.g. to optical switches, is implicitly deemed present, realized using techniques known per se, and consequently does not form part of the subject invention. In addition, the circuit modules may be provided with circuits for management purposes, e.g. for carrying out power measurements for purposes of error detection or power control.

The filters used on the circuit modules preferably are tuneable filters. The use of transponders allows for the possibility of wavelength conversion and/or 3R regeneration.

Of course, the range of possible types is not exhausted with the types shown in FIG. 2 and in FIG. 7. Also, the optical splitters 16 and 17 on the interconnection panel 10 can be used in the same signal transport direction. For example, by providing a circuit module with a (1:2) splitter function and placing it in one of the main module positions, an interconnection panel can be set up as a (1:2N) splitter.

What is claimed is:

1. An optical interconnection system for realizing network elements in optical networks, comprising:
    a plurality of functional optical circuit modules;
    an optical interconnection member including a pair of optical beam splitting means, having a pair of main ports and a plurality of pairs of subsidiary ports, module positions, each of which includes a pair of optical receptacles connected to a pair of subsidiary ports of the pair of optical beam splitting means for plugging in optical circuit modules from the set of circuit modules,
    at least one further module position being connected to the pair of main ports, and
    a plurality of pairs of optical connection ports for connecting external optical signal transport lines, and each module position includes a further pair of optical receptacles, separate pairs of said connection ports having separate optical connections to the further pairs of optical receptacles of separate module positions.

2. An optical interconnection system according to claim 1, wherein the module positions include first and second main module positions, each provided with first and second pairs of optical receptacles, the first pair of optical receptacles of the first main module position having optical connections to the first pair of optical receptacles of the second main module position, the pair of main connection ports having optical connections to the second pair of optical receptacles of the first main module position, and the pair of main ports of the optical splitting means having optical connections to the second pair of optical receptacles of the second main module position.

3. An optical interconnection system according to claim 1, wherein the optical interconnection system comprises a further interconnection member of a same type as the first-mentioned interconnection member, and wherein a pair of subsidiary connection ports of the first-mentioned interconnection member has optical interconnections with the pair of main connection ports of the further interconnection member.

4. An optical interconnection system according to claim 1, wherein the plurality of circuit modules comprises:
    a first group of circuit modules having a first type of signal circuit including a first optical interconnection in a first signal transport direction, and a second optical interconnection in a second signal transport direction, and
    a second group of circuit modules having a second type of signal circuit with a third optical interconnection which transfers the first signal transport direction in the second signal transport direction.

5. An optical interconnection system according to claim 4, wherein an optical amplifier is incorporated in at least one of the interconnections of the signal circuits on the circuit modules.

6. An optical interconnection system according to claim 4, wherein an optical filter is incorporated in at least one of the interconnections of the signal circuits on the circuit modules.

7. An optical interconnection system according to claim 4, wherein an optical transponder is incorporated in at least one of the interconnections of the signal circuits on the circuit modules.

8. An optical interconnection system according to one of claims 1 to 7, wherein the optical interconnection system comprises M interconnection members ($PN_1$ to $PNM_M$), with $M \geq 2$, of a same type as the first-mentioned interconnection member;
    each interconnection member includes a back panel onto which the row of module positions is fitted;
    the M back panels being incorporated into a frame in positions parallel to each other, in which the module positions of the M interconnection panels form a matrix ($\{r,k\}$) of module positions with M rows and N+2 columns, and
    the set of circuit modules comprises a first subset of single circuit modules, and a second subset of multiple circuit modules, in which a single circuit module can be plugged into any one of the module positions of the matrix, and in which a multiple circuit module can be plugged into two or more, with a maximum of M, module positions within any one column of the matrix.

9. An optical interconnection system according to claim 8, wherein the first and the second groups of circuit modules form part of the first subset of circuit modules.

10. An optical interconnection system according to claim 8, wherein the circuit modules of the second subset of multiple circuit modules include two or more, with a maximum of M, signal circuits of a same type as the signal circuits of the first group of circuit modules, said two or more signal circuits being coupled together by means of optical switching devices.

11. An optical interconnection system according to claim 8, wherein the second subset comprises:
    a first group of multiple circuit modules which includes two signal circuits coupled by means of optical crossbar switches, and a second group of multiple circuit modules which include three signal circuits coupled by means of an optical matrix switch.

12. An optical interconnection system according to claim 2, wherein the optical interconnection system comprises a further interconnection member of a same type as the first-mentioned interconnection member, and wherein a pair of subsidiary connection ports of the first-mentioned interconnection member has optical interconnections with the pair of main connection ports of the further interconnection member.

13. An optical interconnection system according to claim 2, wherein the plurality of circuit modules comprises:
   a first group of circuit modules having a first type of signal circuit including a first optical interconnection in a first signal transport direction, and a second optical interconnection in a second signal transport direction, and
   a second group of circuit modules having a second type of signal circuit with a third optical interconnection which transfers the first signal transport direction in the second signal transport direction.

14. An optical interconnection system according to claim 3, wherein the plurality of circuit modules comprises:
   a first group of circuit modules having a first type of signal circuit including a first optical interconnection in a first signal transport direction, and a second optical interconnection in a second signal transport direction, and
   a second group of circuit modules having a second type of signal circuit with a third optical interconnection which transfers the first signal transport direction in the second signal transport direction.

15. An optical interconnection system according to claim 5, wherein an optical filter is incorporated in at least one of the interconnections of the signal circuits on the circuit modules.

16. An optical interconnection system according to claim 5, wherein an optical transponder is incorporated in at least one of the interconnections of the signal circuits on the circuit modules.

17. An optical interconnection system according to claim 6, wherein an optical transponder is incorporated in at least one of the interconnections of the signal circuits on the circuit modules.

18. An optical interconnection system according to claim 9, wherein the circuit modules of the second subset of multiple circuit modules include two or more, with a maximum of M, signal circuits of a same type as the signal circuits of the first group of circuit modules, said two or more signal circuits being coupled together by means of optical switching devices.

19. An optical interconnection system according to claim 9, wherein the second subset comprises:
   a first group of multiple circuit modules which includes two signal circuits coupled by means of optical crossbar switches, and
   a second group of multiple circuit modules which includes three signal circuits coupled by means of an optical matrix switch.

20. An optical interconnection system according to claim 10, wherein the second subset comprises:
   a first group of multiple circuit modules which includes two signal circuits coupled by means of optical crossbar switches, and
   a second group of multiple circuit modules which includes three signal circuits coupled by means of an optical matrix switch.

21. An optical interconnection system according to one of claims 12 to 17, wherein the optical interconnection system comprises M interconnection members ($PN_1$ to $PNM_M$), with $M \geq 2$, of a same type as the first-mentioned interconnection member;
   each interconnection member includes a back panel onto which the row of module positions is fitted;
   the M back panels being incorporated into a frame in positions parallel to each other, in which the module positions of the M interconnection panels form a matrix ($\{r,k\}$) of module positions with M rows and N+2 columns, and
   the set of circuit modules comprises a first subset of single circuit modules, and a second subset of multiple circuit modules, in which a single circuit module can be plugged into any one of the module positions of the matrix, and in which a multiple circuit module can be plugged into two or more, with a maximum of M, module positions within any one column of the matrix.

* * * * *